United States Patent Office 3,293,237
Patented Dec. 20, 1966

3,293,237
PROCESS OF SOLUBILIZING NATIVE COLLAGEN BY REACTING SAID COLLAGEN WITH A STOICHIOMETRIC AMOUNT OF A MINERAL ACID
Charles J. W. Wiegand, Mission, Kans., assignor to the United States of America as represented by the Secretary of Agriculture
No Drawing. Filed Nov. 30, 1962, Ser. No. 241,446
4 Claims. (Cl. 260—123.7)

A non-exclusive, irrevocable, royalty-free license in the invention herein described, throughout the world for all purposes of the United States Government, with the power to grant sublicenses for such purposes, is hereby granted to the Government of the United States of America.

This invention relates to the preparation of water dispersible collagen.

By water dispersible we mean a dispersible sol whereby the particles of collagen in water provide a clear solution, rather than the turbid, translucent, or opaque suspensions which result from physical disintegration of collagenous material. In contrast to a gelatin solution, however, the dispersible sol of the present invention is not attributable to extensive chemical degradation, as the fibers of the product have been examined and characterized by means of an electron microscope; and conversion of the acid salt to a sodium salt produces opaque, insoluble fibers.

By-product uses of collagenous waste material are of economic concern to the meat packing industry. Recent preparations of leather-like sheet material from the fibers of skin material have been obtained by degrading collagen of the skin to an extent that portions of the collagen are converted to a glue for holding the other portions together. A somewhat analogous process has been applied in the preparation of edible films. In all of the reported processes of this type, only a few percent of the collagen is obtained as a dispersible sol.

An object of the present invention is to provide a process whereby substantially all of the collagen is obtained as a dispersible sol. Another object is to obtain a dispersible collagen which provides a clear solution at concentrations of at least 3% in water. Other objects and a fuller understanding of the invention may be had by referring to the following description and claims.

We have discovered that the hydrochloride and hydrobromide salts of collagen disperse completely in warm water to form a sol when mechanically agitated. Upon drying, the collagen sol forms a clear, hard film, yet reabsorbs water readily. The latter property may be utilized to advantage in secondary treatment of the film to stabilize its shape after the sol has been dried, as in the packaging of food and other products.

In general, according to the present invention, collagen is contacted in an aqueous medium with a stoichiometric quantity of a mineral acid until the reaction to neutralize the basic groups of the collagen is essentially complete, thus forming a collagen salt; the water content is adjusted to provide a concentration of about from 1% to 4% collagen salt; the aqueous mixture is warmed, and the collagen salt is physically dispersed to give a collagen sol.

When the source of collagen is an animal side or other protein material containing insoluble, non-collagenous solids; for example, hair fragments or particles of bone, the collagen sol is separated from the insolubles by straining, as through a cloth or finely woven screen.

Preferred mineral acids for neutralizing the basic groups to provide the water soluble collagen salts are hydrochloric acid and hydrobromic acid. The amount of mineral acid constituting a stoichiometric quantity is determined by preliminary reaction of the mineral acid with a representative sample of the source of collagen, as typified by the following description:

A piece of hide was cut into 1 mm. slices. A 3 g. sample was weighed into a 500 ml. Erlenmeyer flask, and 50 ml. of N/10 hydrochloric acid were added. The flask was stoppered and shaken gently for about 4 hours. The liquid was decanted and retained. The hide pieces and the flask were thoroughly washed three times with 20–25 ml. portions of distilled water, each time adding the wash water to the decanted solution. The combined aqueous solution was titrated with N/10 sodium hydroxide using phenolphthalein indicator, and the amount of excess acid subtracted from the amount originally added to determine how much acid had been retained by the hide. The acid used to form the collagen salt was calculated as milliequivalents per gram of sample.

The stoichiometric quantity of acid varies with the previous history of treatment of the collagen source material, as demonstrated by the following table in which the acid consumed is expressed as milliequivalents per gram of hide.

| Sample: | HCl consumed |
|---|---|
| Raw hide (hair clipped) | 0.696 |
| Hide, unhaired by chemical pulping | 0.778 |
| Hide, unhaired by liming | 0.868 |
| Hide, unhaired by enzyme | 0.732 |
| Hide, unhaired by enzyme and limed for 3 days | 0.832 |

Combining the collagen with a substantially stoichiometric amount of the mineral acid is considered essential to the successful preparation of the collagen sol of the present invention. If a deficiency of acid is added to the collagenous material, there is incomplete formation of collagen salt, and part of the collagen will not disperse as a sol. Under the time and temperature conditions of the present process, an excess of mineral acid causes undesirable degradation of the collagen.

The time element for reaction of the acid with the basic groups of the collagen depends upon various factors such as degree of comminution of the collagen source material and whether or not the mixture is stirred or otherwise agitated to expedite formation of collagen salt. The reaction is complete when substantially no free acid remains in the mixture, as can be readily determined by titrating an aliquot of the mixture with dilute alkali.

While the particular means of physically dispersing the collagen salt may be any one of a considerable number of apparatus, the process of the present invention is impractical in operation unless the rate of dispersion of the collagen salt is enhanced by applying some physical force.

Temperature appears to be a significant factor in achieving a collagen sol from the collagen salt. In cold water the collagen salt is relatively insoluble. We have found that a temperature of at least about 30° C., preferably a temperature in the range of about 40° to 50° C., in combination with the physical dispersal, is important for the practical operation of the process to achieve a clear sol. The difference in results, the collagen salt dispersing to a clear solution in only a few minutes in our process, appears to be due to a combination of factors not as yet understood.

The following examples illustrate the practice of the present invention, but are not intended to be in limitation thereof.

*Example 1*

Raw hide, from which the bulk of the hair was removed by clipping, was cut into 1 mm. slices. A weighed amount, 5 g., was transferred to a 250 ml. glass stoppered Erlenmeyer flask; and 34.8 ml. N/10 HCl and an equal volume of water were added. The flask was stoppered and the mixture gently shaken for 16 hours at room temperature. The contents of the flask were transferred with 90 ml. water to a water jacketed, sharp-knifed, high speed blender. The blender was warmed by circulating water at 40° C. through the jacket, and the mixture was agitated by operating the blender for four intermittent one-minute cycles. The dispersion was strained through a nylon cloth. After standing to allow entrained air bubbles to separate, a clear collagen sol was obtained.

*Example 2*

The procedure of Example 1 was varied in that the collagen source was hide unhaired by enzymes, and the stoichiometric quantity of acid was 36.6 ml. of N/10 hydrobromic acid. A collagen sol containing 3% solids was obtained.

*Example 3*

This example followed the general pattern of Example 1 except that hide, unhaired by liming, was used, requiring 43.4 ml. N/10 hydrochloric acid for 5 g. of hide; and the dispersion was achieved by blending for three 1 minute intervals at 50° C.

Upon cooling to room temperature the 3% dispersion sets to a clear, solid gel.

Unlike the hydrochloride and hydrobromide salts, the sodium salts of collagen do not disperse in water. Example 1 was repeated through formation of the hydrochloride salt. A quantity of N/10 sodium hydroxide, sufficient to react with all the hydrochloric acid plus that which would combine with free carboxyl groups, was added to the Erlenmeyer flask and shaking continued until the reaction was complete. Treatment of this product in the blender merely disintegrated in the hide pieces into a mass of insoluble, opaque fibers.

I claim:
1. A process for producing a collagen sol consisting of reacting collagen in the natural state in aqueous medium with a stoichiometric quantity of mineral acid to produce a collagen salt, permitting the reaction to continue until the formation of the collagen salt of the mineral acid is substantially complete, adjusting the water content to provide a concentration of about from 1% to 4% collagen salt in the aqueous medium, warming the aqueous collagen salt and maintaining it at a temperature of at least about 30° C. while physically dispersing the collagen salt in the aqueous medium to produce a collagen sol.
2. The process of claim 1 in which the mineral acid is hydrochloric acid.
3. The process of claim 1 in which the mineral acid is hydrobromic acid.
4. The process of claim 1 in which the source of collagen is animal hide.

References Cited by the Examiner
UNITED STATES PATENTS

| | | | |
|---|---|---|---|
| 3,034,852 | 5/1962 | Nishihara | 260—112 X |
| 3,073,702 | 1/1963 | Keil | 260—123.7 X |
| 3,178,301 | 5/1965 | Veis et al. | 106—124 |

SAMUEL H. BLECH, *Primary Examiner.*

WILLIAM H. SHORT, *Examiner.*

H. SCHAIN, *Assistant Examiner.*